United States Patent
Sullivan et al.

(10) Patent No.: US 6,702,680 B2
(45) Date of Patent: Mar. 9, 2004

(54) FLEXIBLE COUPLING WITH RETAINING RING

(75) Inventors: Michael G. Sullivan, Plainfield, IL (US); Daniel R. Fagan, Plainfield, IL (US)

(73) Assignee: Lovejoy, Inc., Downers Grove, IL (US)

( * ) Notice: Subject to any disclaimer, the term of this patent is extended or adjusted under 35 U.S.C. 154(b) by 0 days.

(21) Appl. No.: 10/205,067

(22) Filed: Jul. 25, 2002

(65) Prior Publication Data

US 2003/0022721 A1 Jan. 30, 2003

Related U.S. Application Data

(60) Provisional application No. 60/308,282, filed on Jul. 30, 2001.

(51) Int. Cl.$^7$ ................................................ F16D 3/54
(52) U.S. Cl. .......................... 464/88; 464/154; 464/901
(58) Field of Search .............................. 464/49, 51, 73, 464/87, 88, 91, 93, 137, 147, 149, 153, 154, 901; 403/348

(56) References Cited

U.S. PATENT DOCUMENTS 3,362,191 A  1/1968  Louette
5,295,911 A  3/1994  Hoyt, III et al.
5,657,525 A  8/1997  Hoyt, III et al.
5,738,585 A  4/1998  Hoyt, III et al.
5,908,355 A  6/1999  Hoyt, III et al.
6,019,684 A * 2/2000  Hoyt et al. .................... 464/88
6,142,878 A  11/2000  Barin
6,159,102 A  12/2000  Hennessey et al.

* cited by examiner

Primary Examiner—Lynne H. Browne
Assistant Examiner—Kenn Thompson
(74) Attorney, Agent, or Firm—Knechtel, Demeur & Samlan

(57) ABSTRACT

A flexible shaft coupling device having two hubs with jaws extending from each hub toward the other hub. A flexible elastomeric belt or cushions fill the gaps between adjacent pairs of jaws. A retaining ring is mounted around the belt or cushions to keep the belt or cushions securely in place. There are a plurality of locking pins adjacent to the edges of the retaining ring and preferably on the interior surface of the ring. These are received in grooves cut in the exterior surface of the belt. When the retaining ring is placed over the belt, the belt is retained between the locking pins. Raised portions or nubs are placed at the entrance and exits of the grooves so that when the ring is rotated with respect to the belt, the locking pins pass over the nubs to securely lock the retaining ring around the edges of the belt. Alternatively the edges of the belt or cushions are tapered to engage the pins in locking engagement.

30 Claims, 5 Drawing Sheets

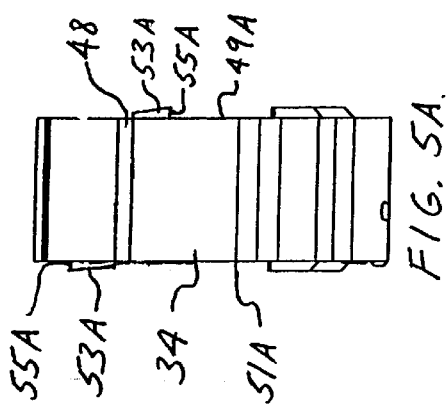
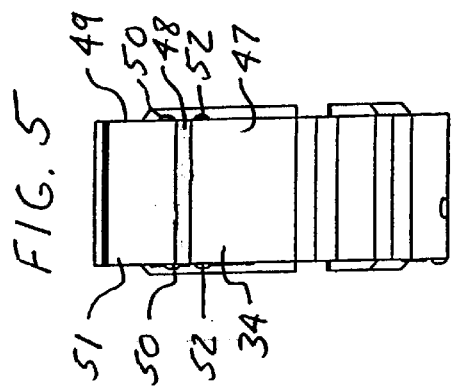
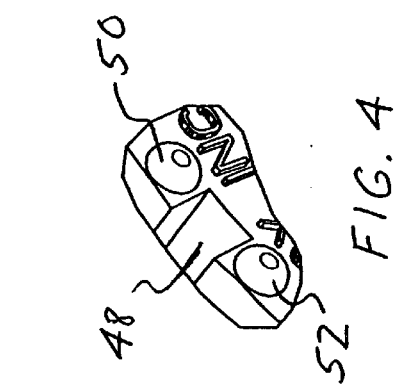
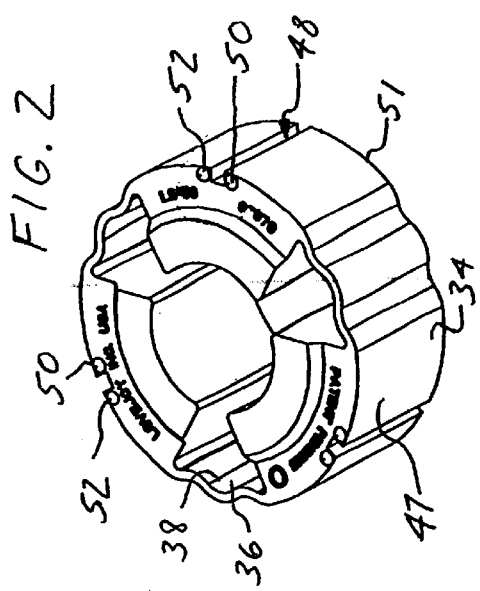
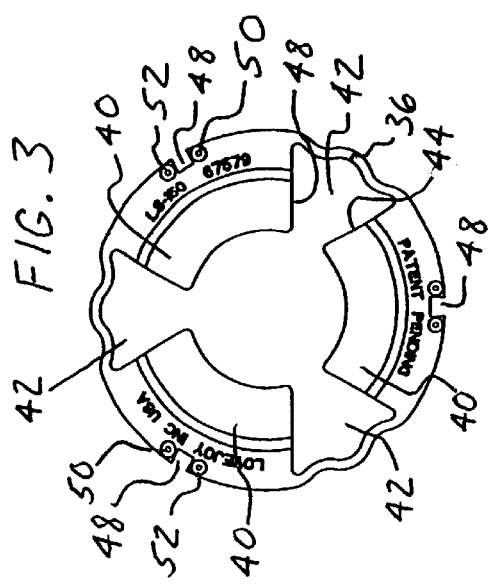

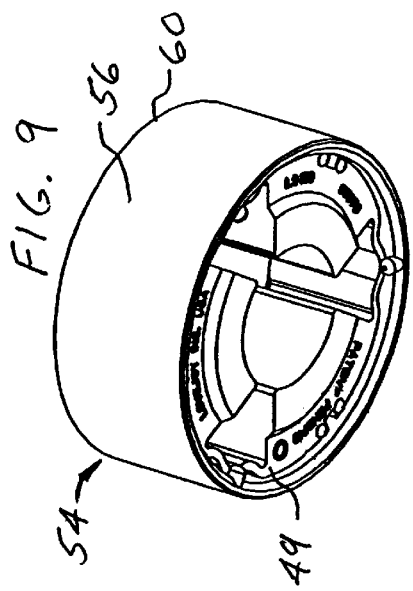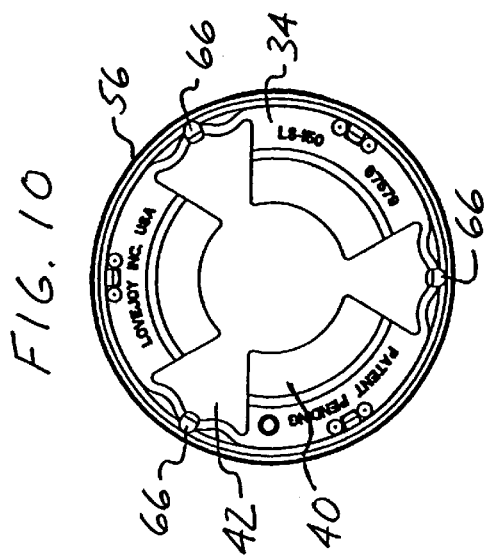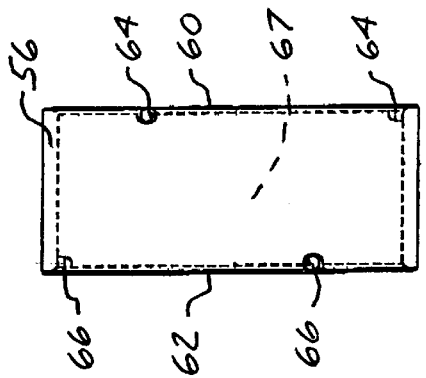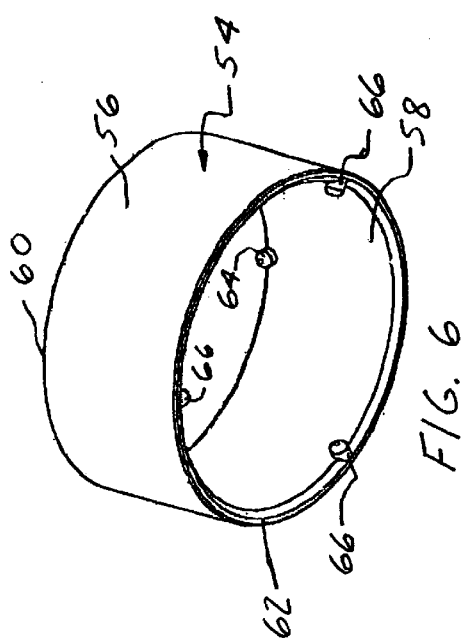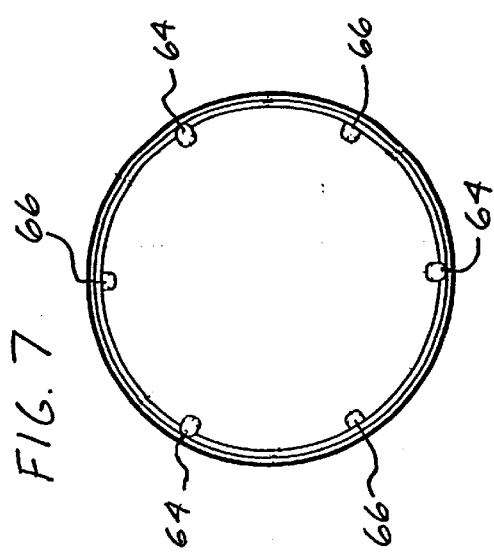

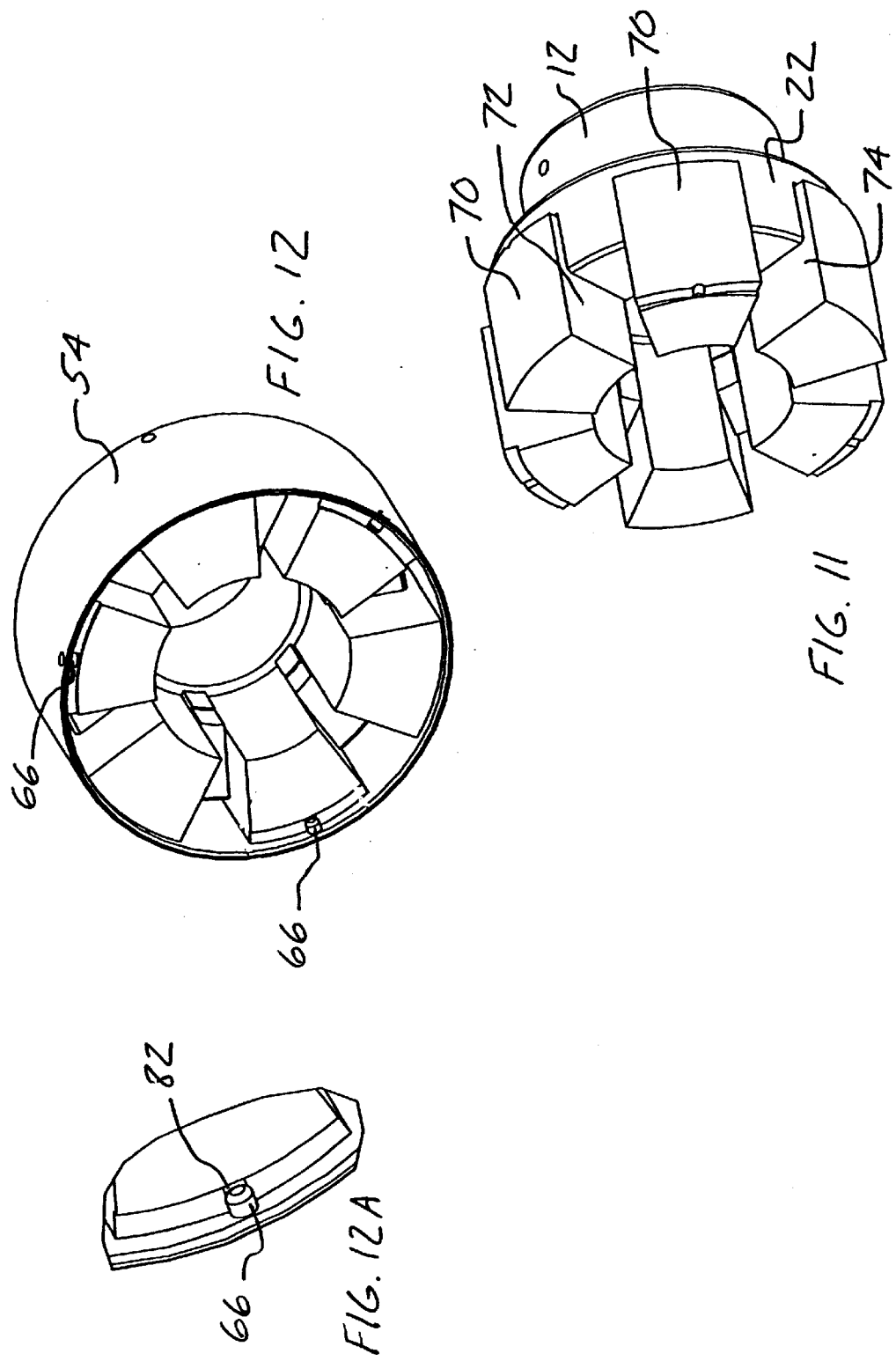

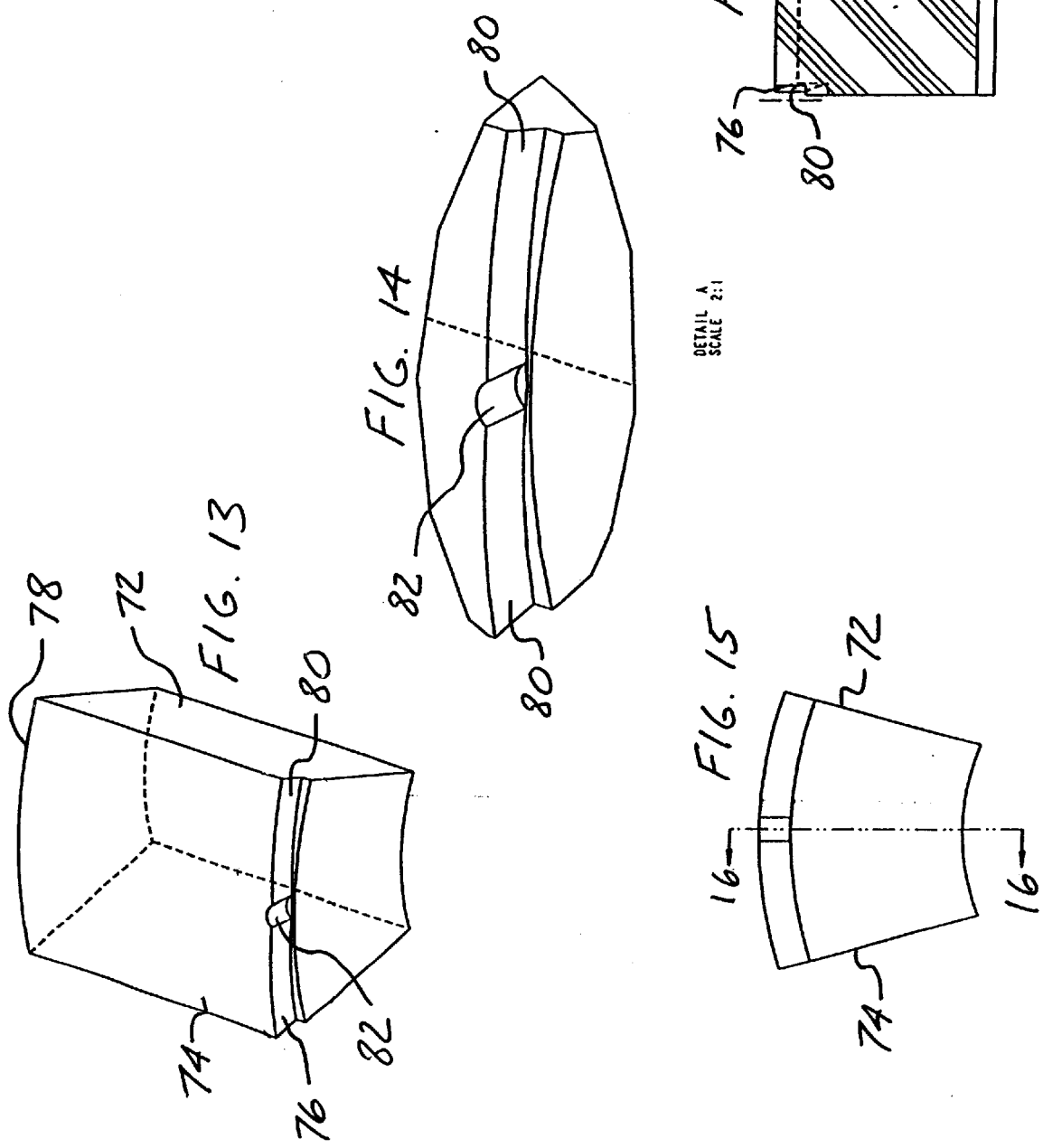

FLEXIBLE COUPLING WITH RETAINING RING

Application claims the benefit of application No. 60/308,282 filed Jul. 30, 2001.

BACKGROUND AND SUMMARY OF THE INVENTION

This invention relates to couplings used for transmitting rotation from one shaft to another, and more particularly, to a coupling using an elastomeric belt or cushions with a retaining ring or sleeve used to keep the belt or cushions in place.

Various types of flexible couplings have been used for connecting one shaft to another. These couplings compensate for relatively minor degrees of shaft misalignment, which are normally encountered in manufacturing operations.

One type of prior art coupling uses two hubs, each hub having a plurality of projecting jaws extending from the hub face toward the other hub face. Such couplings, called jaw-type couplings, are sold by Lovejoy, Inc. of Downers Grove, Ill., the assignee of this application. The hubs are each mounted on one of the shafts. The jaws extending from each hub face are of a length so that they will be slightly separated from the other hub face when the coupling is assembled. The jaws, which are parallel to but overlap each other, are separated by spaces. An elastomeric element, often called a spider, occupies the plurality of spaces formed between adjacent jaws. Thus, the force from the jaws of the one hub is transmitted through the elastomeric element to the jaws of the other hub. These couplings operate with the elastomeric element in compression and have the characteristics of compactness, capable of transmitting large forces and continuing to transmit rotational forces even when the elastomeric element fails. This last characteristic can be an advantage or a shortcoming in that if the elastomeric element fails, the jaws of one hub strike the jaws of the other hub and continue to drive the driven shaft and any equipment to which it is connected. Thus, in an overload condition, the driven equipment is not protected by the coupling.

Another type of flexible coupling is illustrated in U.S. Pat. No. 5,139,460 by Hoyt, III et al., U.S. Pat. No. 6,142,878 to Barin and U.S. Pat. No. 6,159,102 to Barin et al. This type of coupling is similar to the previously described coupling in that both designs have a pair of hubs, each pair of hubs having extending jaws. The hubs are mounted on their respective shafts. However, the jaws on one hub are parallel to and aligned with the jaws on the other hub. A belt surrounds the hubs and fills in the spaces between adjacent pairs of jaws. In this design, the belt operates in shear.

Advantages of this type of design are that the belt provides for misalignment between the shafts; the belt transmits power uniformly; the belt provides damping; and if the belt fails, the driven equipment is protected, as it will essentially be disconnected from the drive shaft. Furthermore, this type of design allows the belt to be replaced without disassembling the hubs or moving the equipment connected to the shafts.

Another type of shear coupling is illustrated in U.S. Pat. No. 5,295,911 to Hoyt, III et al. This design illustrates jaws overlapping each other while using an elastomeric belt between overlapping jaws to transmit the torque. There is also shown a retaining ring surrounding the belt to keep the belt in place.

A problem arises in this coupling in that the retaining ring has a tendency to slip from its desired position of being centered on the belt. If the retaining ring slips off the belt, the belt will come loose and the coupling will disengage. One attempt at solving this problem has been to cut a groove or channel in the belt perpendicular to the edge of the belt. This is illustrated in U.S. Pat. No. 6,024,644 to Hoyt III et al. The solution was to cut another groove perpendicular to and intersecting the first groove, which extends a short distance in either direction around the circumference of the belt. There is a pin on the inside surface of the ring, which is received in the grooves. This design locks the pin in place when rotating in either direction.

Applicant has designed a new flexible coupling that is designed to operate in shear, in which the band or locking ring locks around the elastomeric belt without utilizing a circumferential groove cut into the belt as illustrated in the prior shear type couplings. In an alternate embodiment, the elastomeric belt is not used. Instead it is replaced with a plurality of cushions that are placed between the jaws. The cushions function in the same manner as the elastomeric belt to operate in shear. A retaining ring locks the cushions in place.

Accordingly, it is an object of the invention to provide a flexible coupling which operates in shear and utilizes a retaining ring about the elastomeric belt or cushions.

It is a related object to provide a shear type flexible coupling, which has a retaining ring securely, yet releasably, fastened to the elastomeric belt or cushions. Yet another object is to provide such an elastomeric belt or cushions and retaining ring which secures the retaining ring to the belt or cushions regardless of the direction of rotation of the hubs.

Still another object is to provide a retaining ring that locks around the elastomeric belt or cushions without requiring a circumferential groove to lock the retaining ring to the elastomeric belt or cushions. Related to this object is the object of providing an elastomeric belt or cushions that has raised portions or nubs on the edges of the elastomeric belt or cushions to lock the retaining ring in place. A related object is to provide an angled ramp on the edge of the belt or edge of the cushions that provides progressive resistance, similar to a screw thread.

The invention disclosed herein provides a shear-type flexible coupling in which the jaws on the hubs are in parallel alignment and spaced from each other. A flexible elastomeric belt or cushions fill the gaps between adjacent pairs of jaws. A retaining ring is mounted around the belt or cushions to keep the belt or cushions securely in place. The exterior of the belt surface has a groove cut axially on the outer surface of the belt from one edge of the belt to the other edge. There is a pair of raised projections or nubs on the edge of the belt, preferably on either side of the groove. A locating or locking pin on the inside of the retaining ring is slid along one of the perpendicular grooves until the pin exits the opposite end of the groove. The retaining ring is rotated so that the locking pin also rotates over the raised projection or nub. This locks the retaining ring in place regardless of the side from which the retaining ring is slid onto the belt or the direction of rotation of the coupling. In an alternate embodiment, the edges of the belt or cushions are formed as an angled ramp that provides progressive resistance to the pins to lock the retaining ring around the cushions.

DESCRIPTION OF THE DRAWINGS

FIG. 2 is a perspective view of the elastomeric belt used in the coupling of the present invention.

FIG. 3 is a side view of the elastomeric belt used in the inventive coupling.

FIG. 4 is an enlarged view of the raised portions or nubs on either side of the channel of the belt illustrated in FIGS. 2 and 3.

FIG. 5 is an end view of the elastomeric belt.

FIG. 5A is an end view of an alternate embodiment of an elastomeric belt with ramp portions along the edges of the belt.

FIG. 6 is a perspective view of the retaining ring or collar that slips over the elastomeric belt or cushions to hold the belt or cushions in place around the hubs.

FIG. 7 is a side view of the retaining ring or collar of FIG. 6.

FIG. 8 is an end view of the retaining ring of FIGS. 5 and 6.

FIG. 9 is a perspective view of the retaining ring mounted on the elastomeric belt.

FIG. 10 is an end view of the retaining ring mounted on the elastomeric belt.

FIG. 11 is an alternate embodiment in which cushions are mounted between the jaws instead of an elastomeric belt and in particular illustrates a perspective view of six cushions mounted in the gaps between one of the jaws.

FIG. 12 is a perspective view of the coupling of FIG. 11 with the retaining ring mounted around the cushions.

FIG. 12A is an enlarged view of the edge of the cushion area indicated in the circled area of FIG. 12 illustrating the pin on the ring engaging the recess on the edge of the cushion.

FIG. 13 is an enlarged perspective view of one of the cushions of the coupling illustrated in FIG. 11.

FIG. 14 is an enlarged view of the edge of the cushion indicated in the circled area of FIG. 13 illustrating the ramped edge of the cushion.

FIG. 15 is an end view of the cushion of FIG. 13.

FIG. 16 is a cross sectional view taken along line 16—16 of FIG. 15.

DETAILED DESCRIPTION OF THE PREFERRED EMBODIMENT

Figure 1:
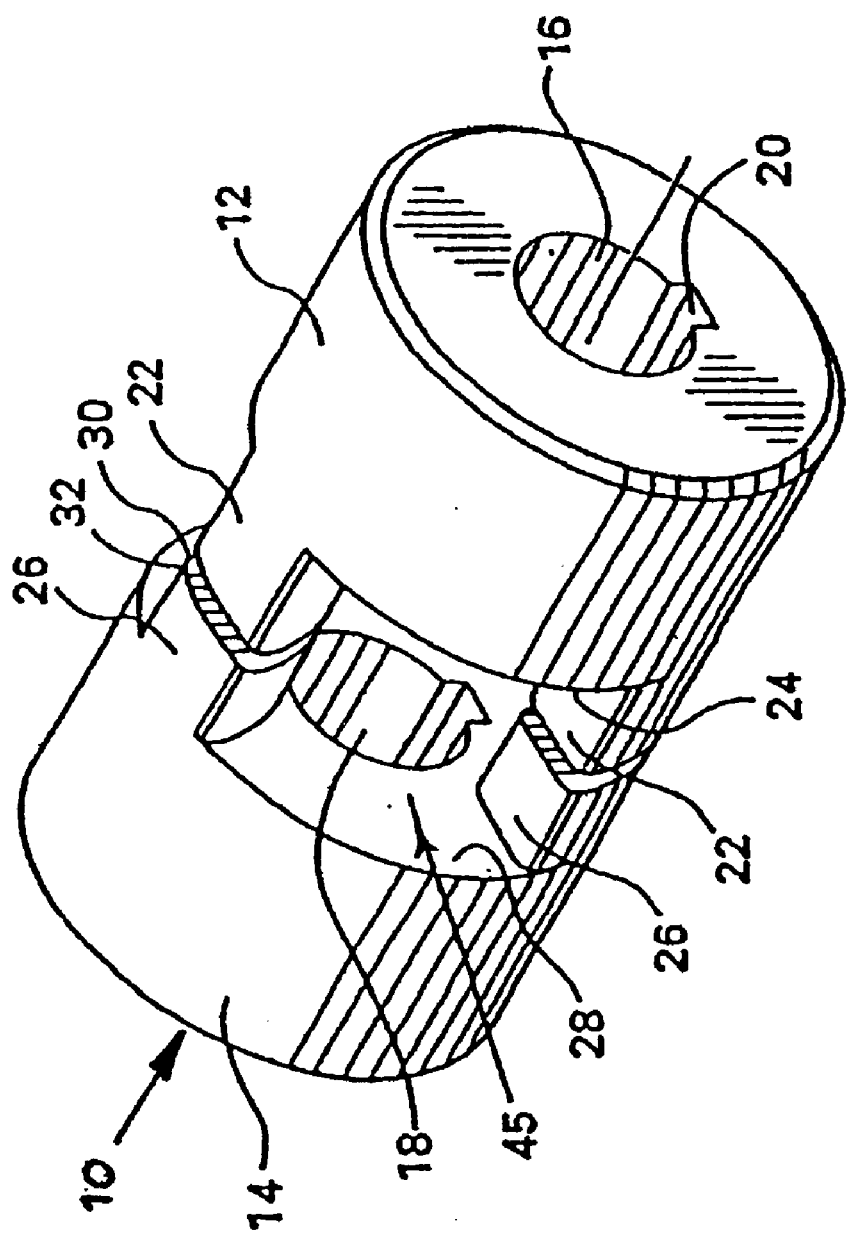
FIG. 1 is a perspective view of two prior art hubs used in a flexible coupling of the present invention.

FIG. 1 illustrates a prior art coupling 10. The coupling 10 is used to connect two aligned shafts (not illustrated), one normally being a drive shaft and the other, a driven shaft. The coupling 10 is comprised of a first cylindrical hub 12 and a second cylindrical hub 14, which are substantially identical to each other. Each cylindrical hub has a central bore 16, 18 which is adapted to receive its respective shaft. The bores 16 and 18 can be of different diameters. It is only necessary that they be the proper size to receive the shaft to which it is to be fastened. The hubs 12 and 14 are secured to the shafts by conventional means such as a keyway 20. However, other conventional manners of affixing the hubs to the shaft can be used such as a setscrew or other such similar means.

When the hubs 12 and 14 are mounted to their respective shafts, they are in substantially axial alignment as shown in FIG. 1. A first set of jaws 22 is located on the first face 24 of the hub 12. The cylindrical hub 14 has a second set of jaws 26 projecting from a second face 28. The first jaws 22 terminate at ends 30 and the second jaws 26 terminate at ends 32. The jaws 22 and 26 and their respective ends 30 and 32 will be axially aligned with each other when the hubs are assembled to their respective shafts. However, they will normally be spaced a short distance from each other so that there is no metal to metal contact between the ends 30 and 32.

In FIG. 2 there is illustrated an elastomeric belt 34 which transmits power from the drive shaft to the driven shaft. The elastomeric belt 34 is usually made of rubber, synthetic rubber, plastic material, or polyurethane. The particular material chosen depends upon the size, load, resistance to oils and chemicals, and temperature for a given application. The belt 34 terminates at split ends 36 and 38. Along the interior of the belt 34 are a plurality of wedge shaped projections 40. The projections 40 are separated by openings 42 defined by sidewalls 44 of the projections 40. The number of projections will equal the number of jaws on the hubs 12 or 14. The wedge shaped projections 40 are dimensioned to be closely received in gaps 45 formed between adjacent pairs of aligned jaws. The jaws 22 and 26 are dimensioned to be closely received within the openings 42 in the elastomeric belt 34. Thus, a close frictional fit is realized between the jaws 22 and 26 and openings 42 with the wedge shaped projections 40 closely received within the gaps 45. The elastomeric belt 34, when it is properly installed on the jaws 22 and 26, will retain the respective jaws in substantially axial alignment with each other. Furthermore, the elastomeric belt 34 serves to transmit the torque from the drive shaft to the driven shaft in the manner intended. The elastomeric belt will accommodate slight amounts of misalignment of the shafts without causing undue stress within the belt itself.

The belt 34 can easily be wrapped around the hubs 12 and 14 when the hubs are mounted to their respective shafts. To accomplish this, the ends 36, 38 are spread apart such that the belt 34 is positioned with the projections 40 within their respective gaps 45. The jaws 22, 26 are received within the openings 42. The ends 36, 38 lightly touch or remain slightly spaced from each other when the elastomeric belt is completely assembled to the hubs 12 and 14.

As seen in FIGS. 2 and 5, there is an outside circumferential wall 47 on the belt 34. There is an axial groove or channel 48 cut in the outside circumferential wall of the belt 34 which extends from one edge 49 of the belt to the opposite edge 51. There may be several grooves 48 disposed around the circumference of the belt 34. As seen in FIG. 3, there are three equally spaced grooves 48 positioned 120° apart. The grooves 48 do not have to be axial, except that they must extend from one edge 49 of the belt to the other edge 51.

As best seen in FIG. 4, there are a pair of raised projections or nubs 50, 52 on either side of the opening of each channel 48. The raised projections or nubs 50, 52 are preferably molded into the belt 34 when it is formed or can be added separately. The nubs 50, 52 are preferably located on both edges 49 and 51 adjacent to the ends of each channel 48.

As illustrated in FIGS. 6–8, a metal collar or retaining ring 54 is used to maintain the belt 34 in a locked position around the belt 34. The retaining ring 54 has an outer surface 56, an inside surface 58, and opposite edges 60 and 62. Locking pins 64 are placed on the interior surface 58 adjacent to the edge 60 and locking pins 66 are placed on the interior surface 58 adjacent to the edge 62. Alternatively the locking pins 64 and 66 can be placed on the edges 60 and 62 respectively, but this may not be as strong of a mounting as on the interior surface. The number of locking pins 64 or 66 preferably equal the number of grooves 48. For strength, the locking pins are preferably formed integrally with the retaining ring 54. The locking pins extend radially from the retaining ring 54 toward a central axis 67 on the retaining ring 54. The central axis runs lengthwise through the center of the retaining ring 54.

To use the coupling, the retaining ring 54 is positioned adjacent to the elastomeric belt 34. The edge 60 or 62 is placed next to the edge 49 or 51 of the belt so that, depending on which edge 60 or 62 is adjacent to the belt 34, the locking pins 64 or 66 are aligned with and adjacent to the entrance to the channels or grooves 48. This is why the number of grooves 48 and pins 64 or 66 should be equal. However, it is possible to use fewer locking pins than channels, but the locking of the ring 54 is not as secure. For illustrative purposes assume that edge 60 is placed adjacent to the belt edge 49. The pins 64 enter the channel or groove 48 and the metal collar 54 is pushed over the belt 34. The pins 64 slide within the channels or grooves 48 until the pins 64 exit the channel 48 at the opposite edge 51 of the belt 34. While holding the belt stationary, the retaining ring 54 is rotated so that the pins 64 are moved out of alignment with the channels or grooves 48. For more secure locking, additional rotating force is applied to the retaining ring 54, which causes the pins 66 to slide over the nubs 50 or 52. This locks them out of alignment with the exit of the channel 48. The opposite pins 64 are located adjacent to the edge 49 of the belt 34 opposite the edge 51 on which the pins 64 are located. Thus the belt 34 is retained between the locking pins 64 and 66. If pins 66 were initially placed nest to the belt edge 49 or 51 and aligned with the grooves 48, the installation is substantially identical.

As seen in FIG. 5A, which is an alternate embodiment of the elastomeric belt 34, the belt 34 has edges 49A and 51A that have ramped portions 53A extending axially outward from the edges 49A and 51A. These ramped portions 53A can be provided in lieu of the nubs 50, 52. They are on either edge 49A and 51 A with the ramped portions on opposite edges extending in opposite directions. The ramped portions 53A function as a thread on a screw by providing a ramp angle over which the locking pins engage the ramped portions 53A in ever increasing resistance as the retaining ring 54 is rotated with respect to the belt 34. To use this alternate embodiment, the coupling is assembled in essentially the same manner as the prior embodiment. The retaining ring 54 is positioned adjacent to the elastomeric belt 34 and the locking pins 64 or 66 are aligned with and adjacent to the entrance to the channels or grooves 48. The pins 64 or 66 enter the channel or groove 48 and the retaining ring 54 is pushed over the belt 34. The pins 64 or 66 slide within the channels or grooves 48 until they exit the channel 48 at the opposite edge of the belt 34. While holding the belt stationary, the retaining ring 54 is rotated with respect to the belt 34 so that the pins 64 or 66 are moved out of alignment with the channels or grooves 48 and engage the ramped portions 53A in frictional engagement. As the retaining ring 54 is rotated further along the ramped portion 53A, the frictional force increases to securely lock the ring to the belt with the pins 64 or 66 out of alignment with the exit of the channel 48. A recess 55A may be provided at the end of the ramped portion 53A, so that the pin engages and seats within the recess 55A to more securely lock the pins 64 or 66 in place.

The width of the belt 34 and the width of the ring 54 must be selected so that the axial distance between the pins 64 and 66 is slightly greater than the width of the belt 34. In this manner, the belt 34 is captured and firmly held between the pins 64 and 66. Thus for each belt 34 having a specific width, there should be a corresponding retaining ring 54 having an axial distance between the pins 64 and 66 slightly greater than the width of the belt 34. The axial distance should not be too great or the retaining ring 54 will freely rotate. This is not desirable as the pins should securely engage the belt edges 49 and 51. The inside surface 58 of the retaining ring 54 is shaped and dimensioned so that the retaining ring 54 fits very snugly around the belt 34. With this design the retaining ring 54 remains locked around the belt 34 regardless of the direction of rotation of the drive or driven shafts. Thus, it is not direction sensitive.

The coupling 10 allows the elastomeric belt 34 to be replaced without requiring the disassembly or removal of the cylindrical hubs 12 or 14. All that is required is that the retaining ring 54 be removed in the reverse sequence of events used for mounting it and then sliding it off the elastomeric belt 34. The belt ends 36 and 38 are spread apart from each other and the belt 34 pulled off from the first and second jaws 22 and 26. A new belt 34 is installed and the retaining ring slid back over the belt 34 with the pins 64 or 66 inserted in the channels 48 until they exit on the opposite edge.

An alternate embodiment of shear type coupling is illustrated in FIGS. 11–16. The hub 12 has six jaws 22. Disposed between the jaws 22 are cushions 70. The number of jaws 22 and cushions 70 are equal, both being six. The number and size of the cushions depend on the force being transmitted by the coupling. A second jaw (not illustrated) is needed to complete the coupling. As seen in FIG. 12, the retaining ring 54 is placed around the cushions 70 to hold them in place in the gaps between the opposed jaws. The retaining ring is similar to the previously described retaining ring 54 and has pins 64 and 66 on the inside surface adjacent to the edges 60, 62.

The cushion 70 is clearly illustrated in FIG. 13. There are sides 72, 74 that engage the faces 24 of the jaws 70. There are opposed edges 76 and 78. The edges 76 and 78 can have ramped portions 80 that extend along the edges 76 and 78 from the sides 72 and 74 to approximately midway between the sides. The ramped portions taper outward from the intersection of the side 72 and the edge 76. At approximately midway between the sides 72 and 74 is a recess or indentation 82.

To use the coupling of the alternate embodiment, the assembly is similar to the assembly of the first embodiment in which an elastomeric belt is used. The retaining ring 54 is slipped over one of the jaws so that it rests on the shaft or the hub 12. The opposed jaw of the pair is aligned. Instead of the belt being disposed about the jaws, the cushions 70 are placed in all gaps between the jaws. The retaining ring 54 is positioned with the pins 66 between adjacent cushions. The ring 54 is then slipped back over the cushions until the pin 66 extends past the edge 76. The ring 54 is rotated with respect to the hubs. This causes the pin 66 to engage the ramped portion 80. As the ring is further rotated, the pin 66 continues engaging the ramped portion with greater frictional force until the pin 66 is received in the recess 82. This releasably locks the ring 54 onto the cushions 70. The pins 64 on the opposite side of the ring 54 operate in the same manner if the ring 54 is installed from the opposite side.

Thus, while there has been provided a flexible coupling that has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A shaft coupling comprising:
   first and second hubs, each having respective first and second faces;
   first and second pluralities of jaws extending from the respective first and second faces, the jaws on the first face in parallel alignment with the jaws on the second face, the aligned jaws forming gaps between adjacent pairs of aligned jaws;
   a split, flexible belt having a defined width, with first and second exterior opposed edges at the extremities of the defined width, and an inside and an outside surface;
   a plurality of spaced projections on the inside surface of the belt, each of the projections occupying one of the gaps;
   a first groove on the outside surface of the belt extending from the first opposed edge of the belt to the second opposed edge;
   a retaining ring adapted for mounting around the belt, the retaining ring having interior and exterior surfaces and first and second opposed ring edges;
   a locating pin protruding from the interior surface of the ring at the first ring edge, the locating pin received in the first groove as the retaining ring is slid over the belt from the first opposed edge of the belt to the second opposed edge of the belt and rotated out of engagement with the groove to a position on the second opposed edge of the belt wherein the locating pin is positioned on the second edge of the belt to secure the retaining ring around the belt.

2. The shaft coupling of claim 1 wherein the first groove extends substantially perpendicular from the first edge of the belt to the second opposed edge of the belt.

3. The shaft coupling of claim 1 and further comprising a second groove on the outside surface of the belt extending from the first edge of the belt to the second opposed edge.

4. The shaft coupling of claim 3 and further comprising a second locating pin protruding from the interior surface of the ring and adjacent to the first ring edge, the second locating pin received in the second groove as the retaining ring is slid over the belt from the first edge of the belt to the second opposed edge of the belt and rotated out of engagement with the second groove until the second locating pin is positioned on the second edge of the belt.

5. The shaft coupling of claim 3 and further comprising a third groove on the outside surface of the belt extending from the first edge of the belt to the second opposed edge.

6. The shaft coupling of claim 5 and further comprising a third locating pin protruding from the interior surface of the ring and adjacent to the first ring edge, the third locating pin received in the third groove as the retaining ring is slid over the belt from the first edge of the belt to the second opposed edge of the belt and rotated out of engagement with the third groove until the third locating pin is positioned on the second edge of the belt.

7. The shaft coupling of claim 1 and further comprising at least one additional locating pin protruding from the interior surface of the ring and adjacent to the second opposite ring edge, the additional locating pin positioned against the first edge of the belt after the retaining ring is slid over the belt until the locating pin exits the first groove and is positioned on the second edge of the belt, whereby the belt is secured between the locating pin and the additional locating pin when the retaining ring is mounted around the belt.

8. The shaft coupling of claim 1 and further comprising a raised portion on the second opposed edge of the belt adjacent to the first groove, the locating pin pushed over the raised portion by rotating the retaining ring with respect to the belt after the retaining ring is mounted on the belt and the locating pin exits the first groove and is positioned on the second edge of the belt.

9. The shaft coupling of claim 8 and further comprising a second raised portion on the second opposed edge of the belt adjacent to the first groove, and opposite the first groove where the raised portion is located, the locating pin pushed over either the raised portion or the second raised portion by rotating the retaining ring with respect to the belt after the retaining ring is mounted on the belt and the locating pin exits the first groove and is positioned on the second opposed edge of the belt.

10. The shaft coupling of claim 3 and further comprising a raised portion and second raised portion on the second opposed edge of the belt adjacent to the second groove.

11. The shaft coupling of claim 9 and further comprising a raised portion and second raised portion on the first opposed edge of the belt adjacent to the first groove.

12. The shaft coupling of claim 10 and further comprising a raised portion and second raised portion on the first opposed edge of the belt adjacent to the second groove.

13. The shaft coupling of claim 1 and further comprising a ramped portion along the second opposed edge of the belt, the locating pin engaging the ramped portion on the second opposed edge of the belt with increased frictional engagement when the retaining ring is mounted around the belt and rotated with respect to the belt.

14. The shaft coupling of claim 13 and further comprising a recess portion on the ramped portion to receive and retain the locating pin when the retaining ring is mounted around the belt and rotated with respect to the belt.

15. A shaft coupling comprising:
   first and second hubs, each having respective first and second faces;
   first and second pluralities of jaws extending from the respective first and
   second faces, the jaws on the first face in parallel alignment with the jaws on the second face, the aligned jaws forming gaps between adjacent pairs of aligned jaws;
   a split, flexible belt having opposed first and second edges, an inside and an outside surface and a width,
   a plurality of spaced projections on the inside surface, each of the projections occupying one of the gaps,
   a first groove on the outside surface of the belt extending from the first edge of the belt to the second edge,
   a retaining ring mounted around the belt, the ring having interior and exterior surfaces and first and second opposed ring edges, the ring formed around a central axis;
   a first locating pin on the ring adjacent to the first ring edge, the first locating pin protruding radially toward the central axis,
   a second locating pin on the ring adjacent to the second ring edge, the second locating pin protruding radially toward the central axis;
   the first locating pin received in the first groove as the retaining ring is slid over the belt from the first edge of the belt to the second opposed edge of the belt until the first locating pin exits the groove and is rotated out of engagement with the groove to a position on the second edge of the belt to secure the belt between the locating pins.

16. The coupling of claim 15 wherein the first and second locating pins are mounted on the ring at a distance slightly greater than the width of the belt whereby the belt is held securely between the locating pins.

17. The coupling of claim 15 and further comprising:
a second groove on the outside surface of the belt extending from the first edge of the belt to the second edge;
a third locating pin on the ring adjacent to the first ring edge protruding radially toward the central axis;
a fourth locating pin on the ring adjacent to the second ring edge, the fourth locating pin protruding radially toward the central axis;
the first and third locating pins received in the first and second grooves respectively as the retaining ring is slid over the belt from the first edge of the belt to the second opposed edge of the belt until the first and third locating pins exit the first and second grooves and are rotated out of engagement with the grooves to a position on the second edge of the belt to secure the belt between the first and second locating pins and third and fourth locating pins.

18. The coupling of claim 17 and further comprising:
a third groove on the outside surface of the belt extending from the first edge of the belt to the second edge;
a fifth locating pin on the ring adjacent to the first ring edge protruding radially toward the central axis;
a sixth locating pin on the ring adjacent to the second ring edge, the sixth locating pin protruding radially toward the central axis;
the first, third and fifth locating pins received in the first, second and third grooves respectively as the retaining ring is slid over the belt from the first edge of the belt to the second opposed edge of the belt until the first, third and fifth locating pins exit the first, second and third grooves respectively and are rotated out of engagement with the grooves to a position on the second edge of the belt to secure the belt between the first and second locating pins and third and fourth locating pins and fifth and sixth locating pins.

19. The shaft coupling of claim 15 and further comprising a raised portion on the second opposed edge of the belt adjacent to the first groove, the first locating pin pushed over the raised portion by rotating the retaining ring with respect to the belt after the retaining ring is mounted on the belt and the first locating pin exits the first groove at the second edge of the belt.

20. The shaft coupling of claim 19 and further comprising a second raised portion on the second opposed edge of the belt adjacent to the first groove, and opposite the first groove where the raised portion is located, the first locating pin pushed over either the raised portion or the second raised portion by rotating the retaining ring with respect to the belt after the retaining ring is mounted on the belt and the first locating pin exits the first groove and is positioned on the second opposed edge of the belt.

21. The shaft coupling of claim 17 and further comprising a raised portion and second raised portion on the second opposed edge of the belt adjacent to the second groove.

22. The shaft coupling of claim 17 and further comprising a raised portion and second raised portion on the first opposed edge of the belt adjacent to the second groove.

23. The shaft coupling of claim 15 and further comprising a raised portion and second raised portion on the first opposed edge of the belt adjacent to the first groove.

24. The shaft coupling of claim 15 and further comprising a ramped portion along the second opposed edge of the belt, the first locating pin engaging the ramped portion on the second opposed edge of the belt with increased frictional engagement when the retaining ring is mounted around the belt and rotated with respect to the belt.

25. A shaft coupling comprising:
first and second hubs, each having respective first and second faces;
first and second pluralities of jaws extending from the respective first and second faces, the jaws on the first face in parallel alignment with the jaws on the second face, the aligned jaws forming gaps between adjacent pairs of aligned jaws;
a plurality of cushions occupying the gaps between the adjacent pairs of jaws, the cushions having a defined width, with a first exterior exposed edge and a second exterior exposed opposed edge at the extremities of the defined width;
a retaining ring adapted for mounting around the cushions, the retaining ring having interior and exterior surfaces and first and second opposed ring edges;
a locating pin protruding from the interior surface of the ring at the first ring edge and remote from the second ring edge, the locating pin engaging the second edge of the cushion after the retaining ring is slid from the first edge of the cushion to the second edge of the cushion and rotated so that the locating pin is positioned on the second edge of the cushion to secure the retaining ring around the cushions.

26. The shaft coupling of claim 25 and further comprising at least one additional locating pin protruding from the interior surface of the ring and adjacent to the second opposite ring edge, the additional locating pin positioned against the first edge of the cushion after the retaining ring is slid over the cushion and the locating pin is positioned on the second edge of the cushion, whereby the cushion is secured between the locating pin and the additional locating pin when the retaining ring is mounted around the cushions.

27. The shaft coupling of claim 25 and further comprising a ramped portion along the second edge of the cushion, the locating pin engaging the ramped portion on the second edge of the cushion with increased frictional engagement when the retaining ring is mounted around the cushions and rotated with respect to the cushions.

28. The shaft coupling of claim 27 and further comprising a recess portion on the ramped portion to receive and retain the locating pin when the retaining ring is mounted around the cushions and rotated with respect to the cushions.

29. The shaft coupling of claim 27 and further comprising a second ramped portion along the first edge of the cushion, the additional locating pin engaging the second ramped portion on the first edge of the cushion with increased frictional engagement when the retaining ring is mounted around the cushions and rotated with respect to the cushions.

30. The shaft coupling of claim 29 and further comprising a recess portion on the second ramped portion to receive and retain the additional locating pin when the retaining ring is mounted around the cushions and rotated with respect to the cushions.

* * * * *